United States Patent [19]
Chevalier et al.

[11] Patent Number: 5,941,064
[45] Date of Patent: Aug. 24, 1999

[54] FUEL INJECTION DEVICE FOR RAMJETS FOR AIRCRAFT

[75] Inventors: Alain Chevalier, Asnieres-les-Bourges; Marc Bouchez, Bourges, both of France

[73] Assignee: Aerospatiale Societe Nationale Industrielle, Paris, France

[21] Appl. No.: 08/808,686

[22] Filed: Feb. 28, 1997

[30] Foreign Application Priority Data

Mar. 1, 1996 [FR] France ..................................... 96 02602

[51] Int. Cl.$^6$ ....................................................... F02K 7/10
[52] U.S. Cl. ............................................. 60/270.1; 60/740
[58] Field of Search ..................................... 60/270.1, 734, 60/740

[56] References Cited

U.S. PATENT DOCUMENTS

| | | | |
|---|---|---|---|
| 4,903,480 | 2/1990 | Lee et al. ................................. | 60/270.1 |
| 5,214,914 | 6/1993 | Billig . | |
| 5,253,474 | 10/1993 | Correa et al. . | |
| 5,660,040 | 8/1997 | Henry et al. ............................ | 60/270.1 |

FOREIGN PATENT DOCUMENTS

| | | |
|---|---|---|
| 2216999 | 10/1989 | United Kingdom . |
| WO A 8808927 | 11/1988 | WIPO . |

OTHER PUBLICATIONS

Masuya, et al "Ignition and Combustion Performance of Scramjet Combustors with Fuel Injection Struts," J. Propulsion and Power, vol. 11, No. 2, Mar. 1995, pp. 301–306.

Bogdanoff, "Advanced Injection and Mixing Techniques for Scramjet Combustors," Journal of Propulsion and Power, vol. 10, No. 2, Mar. 1994, pp. 183–190.

Wieting, et al. "Thermal–Structural Design/Analysis of an Airframe–Integrated Hydrogen–Cooled Scramjet," J. Aircraft, vol. 13, No. 3, Mar. 1976, pp. 192–197.

Buchmann, "Thermal–Structural Design Study of an Airframe–Integrated Scramjet," NASA Contractor Report 3141, 1979, pp. 1–34.

*Primary Examiner*—Louis J. Casaregola
*Attorney, Agent, or Firm*—Stevens, Davis, Miller & Mosher, L.L.P.

[57] ABSTRACT

The present invention concerns a fuel injection device for ramjets for supersonic and/or hypersonic aircraft, said ramjet comprising a combustion supporting gas inlet and, downstream thereof, a combustion chamber and a nozzle adapted to channel gases leaving the combustion chamber. In accordance with the invention, the injection device includes at least one injector having a structure with a plurality of spaced walls extending generally along the longitudinal axis of the ramjet body, fuel being injected into each space formed by two adjacent walls of said plurality of walls and at the downstream end of said structure.

3 Claims, 2 Drawing Sheets

FUEL INJECTION DEVICE FOR RAMJETS FOR AIRCRAFT

BACKGROUND OF THE INVENTION

1. Field of the Invention

The present invention concerns a fuel injection device for ramjets for supersonic and/or hypersonic aircraft, designed to operate over a wide range of speeds. The range of speeds envisaged is typically between Mach 1–2 and 15–20 (a contribution to the thrust could be envisaged at Mach 0.8, for example).

2. Description of the Prior Art

Ramjets are engines useful for propulsion of aircraft traveling at a wide range of speeds with a low specific consumption. The fuel usually employed for applications at high speeds is hydrogen, which is generally injected in gas form. Hydrocarbons, with a lower calorific value but a higher density, can also be used in part of the flight envelope. However, the correct distribution of the fuel throughout the stream, optimal mixing, correct ignition and stable combustion require high-performance injection devices both in the case of subsonic combustion and in the case of supersonic combustion. The phenomena associated with these two modes of combustion being different, the associated injection geometries are often different. Moreover, to operate over a wide range of flight conditions a ramjet supporting both modes of combustion, subsonic and supersonic, must accommodate the transition between them. This generally necessitates a mechanical modification of the geometry of the body of the ramjet and of the injection device.

This can naturally give rise to the problems in manufacture and in service.

An aim of the present invention is to eliminate these drawbacks and the present invention concerns an injection device assuring an aerodynamic transition rather than a mechanical transition between subsonic combustion and supersonic combustion.

SUMMARY OF THE INVENTION

To this end, the fuel injection device for ramjets for supersonic and/or hypersonic aircraft, designed to operate over a wide range of speeds, said ramjet comprising, in a body having a longitudinal axis, a combustion supporting gas inlet and, downstream thereof, in the direction of flow of the jet of gas, a combustion chamber in which combustion supporting gas is mixed with fuel to be burned, and a nozzle adapted to channel gases leaving said combustion chamber, said fuel injection device being provided at the level of said combustion chamber, is noteworthy in that it includes at least one injector having a structure with a plurality of spaced walls extending generally along said longitudinal axis of said ramjet body, fuel being injected into each space formed by two adjacent walls of said plurality of walls and at the downstream end of said structure.

The combustion conditions can therefore be controlled at the level of the injection device, without using moving parts (mechanical transition), simply by altering the distribution of the flowrate of fuel injected into the spaces between adjacent walls of said structure ("primary" injection) and at the downstream end of the latter ("secondary" injection).

In a first embodiment, pairs of said walls form the wings of a profiled member that is substantially U-shape in cross-section, first injection orifices opening onto a top face of a core of said profiled member and second injection orifices opening at a downstream free end of said profiled member.

Preferably, the core of said profiled member is inclined from the upstream end towards the downstream end of said structure so as to form a cross-section of said profiled member of maximal area at a downstream end thereof and said first injection orifices are near an upstream part of said core.

In another embodiment, said plurality of walls is made up of spaced parallel walls, first injection orifices opening onto facing faces of two adjacent walls and second injection orifices opening at a downstream free end of said walls.

Advantageously, said walls are at least substantially parallel to lateral faces of the ramjet body or at least substantially parallel to top and bottom walls of the latter.

The figures of the accompanying drawings show clearly how the invention may be put into effect. In the figures, the same reference numbers designate similar components.

DETAILED DESCRIPTION OF THE PREFERRED EMBODIMENTS

The fuel injection device of the invention is designed to be fitted to a ramjet for supersonic and/or hypersonic aircraft, adapted to operate over a wide range of speeds, i.e. a Mach number from 1–2 to 15–20.

Figure 1:
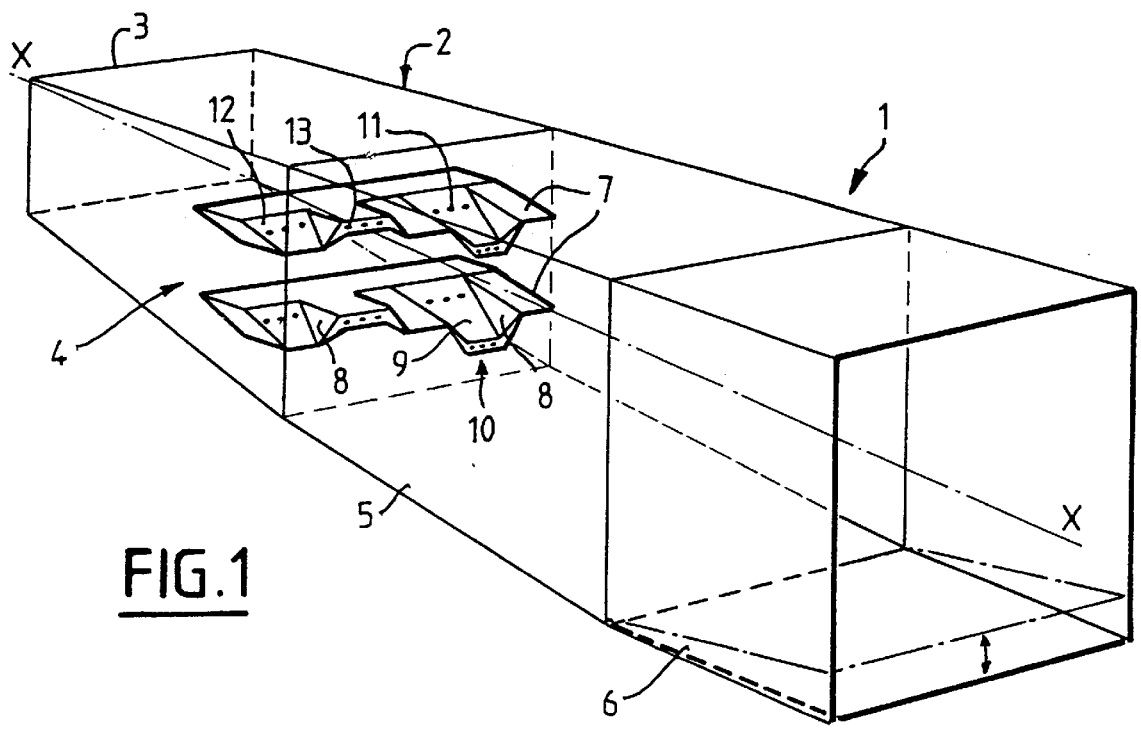
FIG. 1 is a diagrammatic perspective view of a ramjet fitted with one embodiment of the injection device of the invention.

The ramjet 1 shown diagrammatically in FIG. 1 comprises, within a casing or envelope 2:

- an inlet 3 for combustion supporting gas, in particular an air inlet, at the upstream end of the engine, designed to be located under the lower surface of the fuselage of the aircraft with which the ramjet is associated,
- a fuel injection device 4 downstream of the combustion supporting gas inlet 3,
- the casing or envelope 2 enclosing, in the upstream to downstream direction with reference to the direction of flow of the jet symbolically represented by the arrow F in the figures: a combustion chamber 5 containing the injection device, in which the combustion supporting gas is mixed with the fuel to be burned, and a nozzle 6 having a throat adapted to channel gases leaving the combustion chamber.

Figure 2:
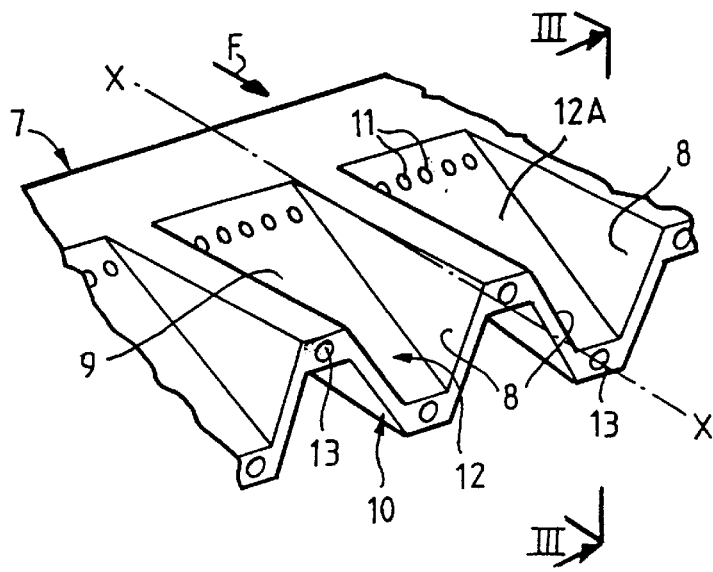
FIG. 2 is a perspective view of one embodiment of an injector of the invention.
Figure 4A:
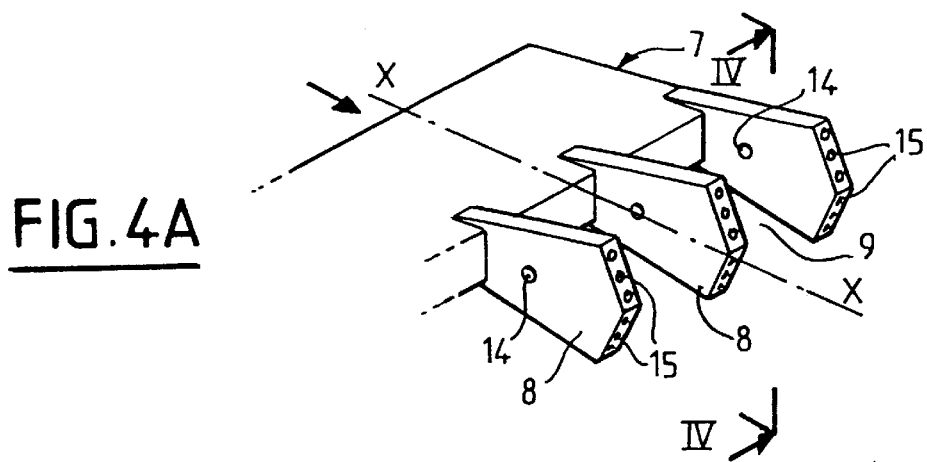
FIGS. 4A, 4B and 4C are respectively a perspective view, a top view and a longitudinal sectional view taken along the line IV—IV in FIG. 4A of another embodiment of an injector of the invention.

As shown in FIG. 1, the fuel injection device 4 includes injectors 7 having a (pylon-like) structure featuring, as seen more clearly in FIGS. 2 and 4A, a plurality of spaced walls 8 extending generally along the axis X-X of the body 2 of the ramjet, the fuel being ejected into each space 9 formed by two adjacent walls 8 and also at the downstream end of said structure (pylon base).

Figure 3:
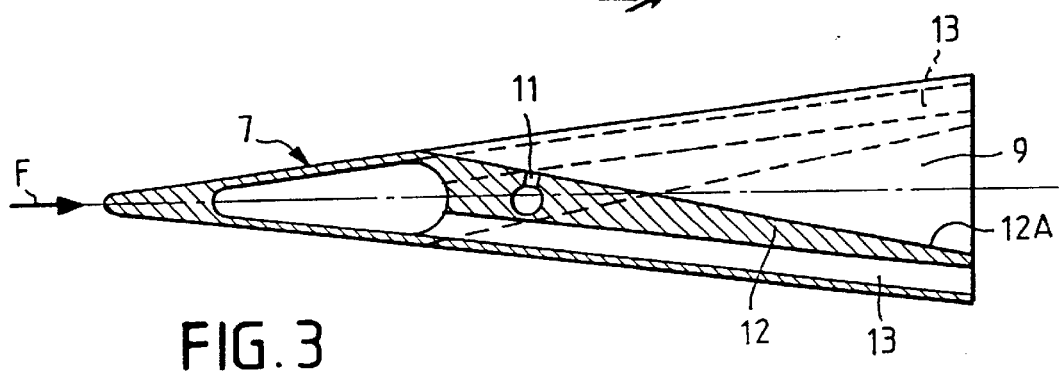
FIG. 3 is a longitudinal section taken along the line III—III in FIG. 2.

In a first embodiment of the injector 7, shown in FIGS. 1, 2 and 3, the pairs of walls 8 form the wings of a profiled member 10 that is substantially U-shaped in cross-section, first (primary injection) injection orifices 11 opening onto the top face 12A of the core 12 of the profiled member 10 and second (secondary injection) injection orifices 13 opening at the downstream free end of the profiled member (pylon base).

As can be seen in the figures, the core 12 of the profiled member 10 is inclined from the upstream end towards the downstream end of the structure so as to form a cross-section of the profiled member with its maximal area at the downstream (free) end of the latter. The first injection orifices 11 are near the upstream part of the core 12.

Figure 4B:
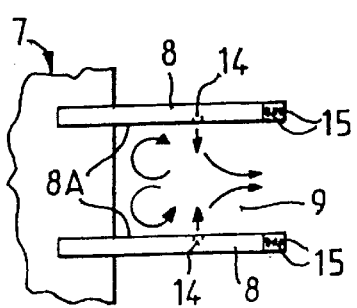
Figure 4C:
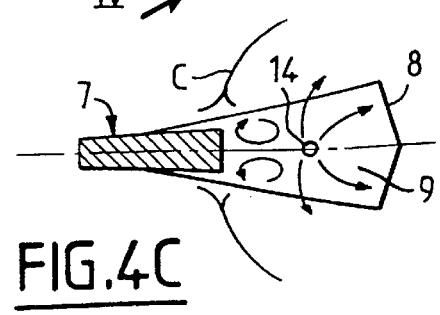

In a second embodiment of the injector 7, shown in FIGS. 4A through 4C, the plurality of walls is made up of parallel spaced walls 8 forming the teeth of a comb, so to speak. In this case, first (primary injection) injection orifices 14 open onto the facing faces 8A of two adjacent walls 8 and second injection orifices 15 open at the downstream free end (base) of said walls 8.

The figures show that the walls 8 are at least substantially parallel to the lateral faces of the body 2 of the ramjet. They could equally well be orthogonal to said faces.

Figure 5A:
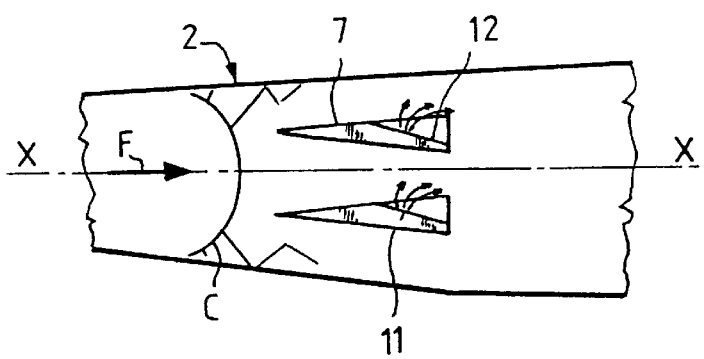
FIGS. 5A and 5B show in section the operation of the ramjet at the level of the injection device in subsonic combustion and in supersonic combustion, respectively.

FIG. 5A illustrates the operation of the ramjet 1 in subsonic combustion. Ignition of the fuel injected by the first injection orifices 11 generates a normal shockwave C at the upstream end (see also FIG. 4C) The normal shockwave is stabilized and controlled by action at the (mobile) throat of the nozzle 6 (as shown in chain-dotted line in FIG. 1).

Figure 5B:
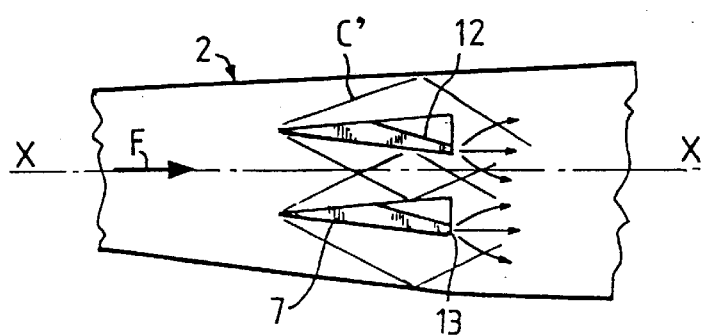

FIG. 5B illustrates the operation of the ramjet 1 in supersonic combustion. Longitudinal injection at the downstream end of the injector 7 (second injection orifices 13) generates supersonic combustion stabilized in particular by the oblique shockwave C'.

The injection device of the invention therefore provides an aerodynamic transition between subsonic and supersonic combustion, injection at a low rate if necessary blocking the flow initiating the normal shockwave leading to subsonic flow in the combustion chamber.

A very low flowrate can advantageously produce areas facilitating ignition, without initiating the normal shockwave. In other words, under certain operating conditions, to assure ignition in supersonic combustion, if necessary, the first injection orifices can advantageously be fed with a very low but non-zero flowrate in order to create (very localized) areas at a higher temperature to allow ignition, without generating the normal shockwave C of FIG. 5A, the flow remaining globally supersonic as can be seen in FIG. 5B.

Injection between the walls 8 of the structure 7 defined hereinabove produces an extremely complex flow that is strongly dependent on interactions between three-dimensional shockwave structures, and the boundary layer has an important influence.

Without this type of injection, the (supersonic) flow produced by a geometry of this kind induces excellent ignition conditions: low speed, high thermodynamic conditions (pressure, temperature). It is then sufficient to inject the fuel at the pylon base (of relatively small cross-section) to obtain satisfactory supersonic combustion. As already indicated, the injectors shown by way of example all utilize injection at the pylon base.

However, when fuel is injected into the structure 7 having the particular geometry described hereinabove, the addition of mass, the ignition and the combustion that arise in the internal area cause a very substantial modification of the conformation of the flow. As shown diagrammatically in the figures, a powerful shockwave appears that very substantially increases the pressure and the temperature and leads to the formation of a stable normal shockwave. The penetration of the injected jet into this area is substantially increased, even if it is a liquid fuel (in this regard, it should be noted that in addition to hydrogen other fuels may be used with this type of injector, such as kerosene or methane). The combustion which then takes place in the combustion chamber is then subsonic.

There is claimed:

1. A fuel injection device for a ramjet for supersonic and/or hypersonic aircraft, designed to operate over a wide range of speeds, said ramjet comprising, in a body having a longitudinal axis, a combustion supporting gas inlet and, downstream thereof, in the direction of flow of a jet of gas, a combustion chamber in which combustion supporting gas is mixed with fuel to be burned, and a nozzle adapted to channel gases leaving said combustion chamber, said fuel injection device being provided in said combustion chamber and including at least one injector comprising:

a profiled member having a plurality of spaced walls extending generally along said longitudinal axis of said ramjet body, wherein pairs of said walls form the wings of said profiled member that is substantially U-shape in cross section;

first injection orifices provided in an upstream part of said profiled member for injecting fuel into each space formed by two adjacent walls of said plurality of walls, said first injection orifices opening onto a top face of a core of said profiled member; and second injection orifices provided at a downstream part of said profiled member for injecting fuel at the downstream end of said injector, the combustion modes of said ramjet being controlled by altering the distribution of the flowrates of fuel injected by said first and second injection orifices.

2. The injection device claimed in claim 1 wherein said core of said profiled member is inclined from the upstream end towards the downstream end of said structure so as to form a cross-section of said profiled member of maximal area at a downstream end thereof and said first injection orifices are near an upstream part of said core.

3. The injection device claimed in claim 1 wherein said walls are at least substantially parallel to lateral faces of said ramjet body.

* * * * *